United States Patent [19]

Andrews

[11] 4,427,702
[45] Jan. 24, 1984

[54] ICE CREAM SCOOP ASSEMBLY

[76] Inventor: John L. Andrews, 1711 Knoll, Houston, Tex. 77080

[21] Appl. No.: 376,849

[22] Filed: May 10, 1982

[51] Int. Cl.³ .............................................. A23G 9/00
[52] U.S. Cl. .................................... 426/101; 426/139; 426/282; 426/283; 426/104; 426/565
[58] Field of Search .............. 426/139, 101, 104, 249, 426/282, 283, 572, 565

[56] References Cited

U.S. PATENT DOCUMENTS

| | | | |
|---|---|---|---|
| 1,794,238 | 2/1931 | McKibben | 426/139 |
| 1,942,896 | 1/1934 | Jones | 426/139 |
| 2,045,730 | 6/1936 | Schepman | 426/139 |
| 2,096,532 | 10/1937 | Balton | 426/139 |
| 2,114,205 | 4/1938 | Balton | 426/139 |
| 2,248,448 | 7/1941 | Chester | 426/139 |

Primary Examiner—Jeanette M. Hunter
Attorney, Agent, or Firm—Arnold S. Cohn

[57] ABSTRACT

An ice cream cone assembly comprising a cone with a pre-formed seating area whereby the male portion of a pre-formed ice cream scoop interlocks with the cone, the said ice cream scoop being stackable on other scoops in a cavity of the same shape as the male guide of the ice cream scoop.

3 Claims, 4 Drawing Figures

U.S. Patent                 Jan. 24, 1984                 4,427,702

ICE CREAM SCOOP ASSEMBLY

BACKGROUND OF THE INVENTION

Prior to the invention of the subject matter of this invention, ice cream cones largely consisted of spherical shaped scoops which are manually pressed onto a cone utilizing a scoop utensil. The ice cream is maintained in a container at a temperature which allows manual scooping. The ice cream is exposed to the ambient conditions allowing possible contamination. As multiple scoops are required, the ice cream cone becomes unstable. If additional ingredients are desired they must be sprinkled onto or the ice cream scoop rolled among various possible condiments.

SUMMARY OF THE INVENTION

An object of the invention is to provide a self-locking ice cream scoop that will secure itself to a mating ice cream cone which relys on surface contact as compared to circumferential point contact as is commonly obtained with round scoops of ice cream which are pressed onto the top of a cone. In practice, the ultimate consumer places a pre-formed scoop of ice cream into a cone, constraining the scoop in the cone. In doing this, no scooping utensils are required.

A further object of the invention is to take advantage of a sanitary pre-wrapped scoop of ice cream which eliminates the direct contamination of the ice cream during storage and handling. Since the ice cream scoop is pre-molded it can be also pre-wrapped thusly avoiding the need for direct handling.

A further object of the invention is to provide an ice cream scoop which is stackable thusly allowing individual choices or combinations of flavors in a multi-scooped ice cream cone. The cavity feature of the ice cream scoop allows the male guide feature of the ice cream cone to be self-locating and self-locking within a mating cone or mating scoop.

A further object of the invention is to provide an ice cream scoop to which additional sauces, condiments, and other ingredients can be added thereon and into without the necessity of pouring, sprinkling, or rolling the additional sauce and ingredient thereonto. The pre-formed cavity acts as a container for said additional ingredients.

Another objective of the invention is to provide a pre-molded scoop of ice cream which can be served at a frozen temperature significantly less than at the warmer temperature which is necessary for scooping. This allows the ultimate consumer to enjoy his treat for a longer period of time.

Other similar objects, advantages and features of this invention will become apparent and may be achieved by the means contained and described in this specification when read in conjunction with the accompanying figures which illustrate and claims which define several useful embodiments in accordance with this invention.

DESCRIPTION OF THE DRAWINGS

In FIG. 1 the ice cream cone assembly 99 consisting of cone 20 and ice cream scoop 10 is illustrated. The cone 20 is a cylindrically apex shaped having an angle 21. An ice cream scoop 10 is seated in the scoop seating area 22' at the cone seating area 22.

Figure 1:
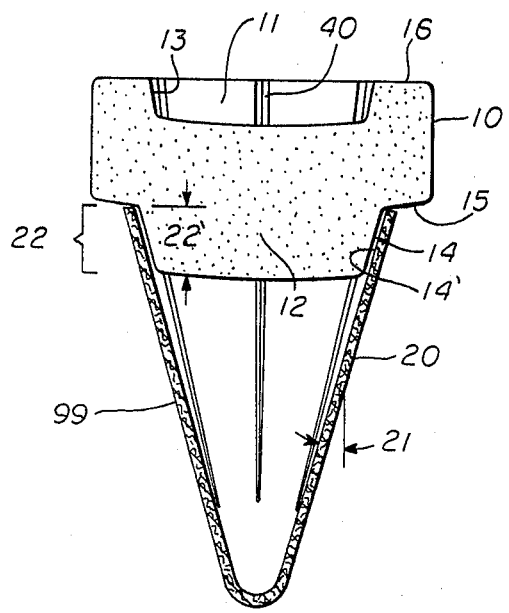
FIG. 1 is a section view of the ice cream cone assembly 99.

The ice cream scoop 10 is cylindrically shaped having a cavity 11 and a guide 12. The said cavity 11 has an angulated female surface 13 which extends from the top of the said ice cream scoop 10 downward. The top of the ice cream scoop 10 has a ledge 16 capable of supporting multiple numbers of similar ice cream scoops 10. The lower portion of ice cream scoop 10 consists of a male shaped guide 12 which is so angulated forming male surface 14 over a scoop seating area 22'. The angulation along said male surface 14 is consistant with the angulation of the said female surface 13 and the said angle 21.

Figure 2:
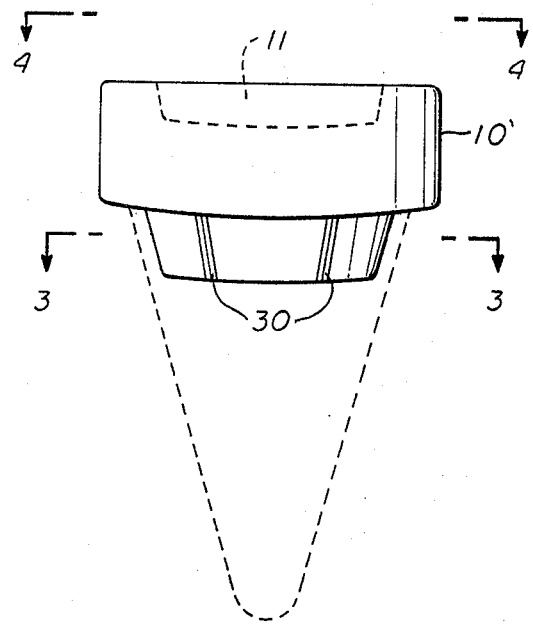
FIG. 2 is a section view of another embodiment of ice cream cone assembly 99.

In FIG. 2, an ice cream scoop 10' is disclosed. The principle difference between the ice cream scoop 10' disclosed in this figure as compared to ice cream scoop 10 is that the cavity 11 has a plurality of grooves 40 and the lower end of ice cream scoop 10' has a plurality of teeth 30. The teeth 30 reguire mating grooves 40.

Figure 3:
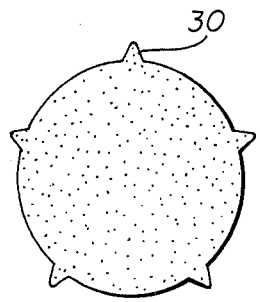
FIG. 3 is a section view of the teeth 30.

In FIG. 3, the V-shaped teeth 30 are shown. A plurality of said teeth 30 are utilized to insure adequate securing of the ice cream scoop 10' in the cone 20'.

Figure 4:
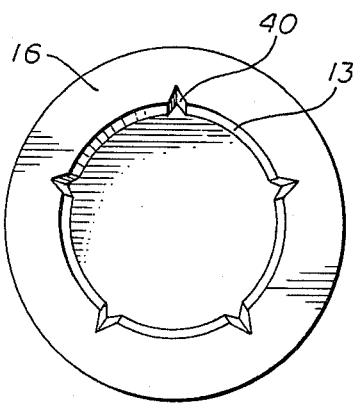
FIG. 4 is a section view of the grooves 40.

In FIG. 4, a plurality of grooves 40 are disclosed which are circumferentially located around the said cavity 11 and around the top portion of cone 20'.

DESCRIPTION OF THE PREFERRED EMBODIMENTS

As we know a typical ice cream cone is comprised of a cone, a scoop (or scoops) of ice cream and any confectionery type condiment. In order to assemble this treat a manual scooping utensil scrapes the ice cream from a larger container or package and molds it into a spherical shaped form and then presses and releases this ice cream scoop onto and partially into a cone.

In order to scrape and spherically mold the ice cream, it is necessary to maintain the temperature of the ice cream at a temperature slightly below the freezing temperature since ice cream loses its pliability as the temperature drops far below the freezing temperature. Since the invention consists of a premolded ice cream scoop it may be refrigerated at a temperature far below freezing. This allows the ultimate consumer a significantly longer period of time to enjoy his treat.

Once the wrapping is removed from the pre-formed ice cream scoop it can easily be inserted in a cone which accepts the male guide of the scoop. The guide and cone may have a plurality of teeth and groves which communicate together thusly preventing rotation of the scoop in the cone.

The ice cream scoop has a cavity which serves a twofold purpose. In multiple scoop ice cream cones it has been found that the second scoop is unstable since it relies on a "cold weld or fusion" resulting from the assembly pressure of the server when he pushes the upper scoop on the lower scoop. In the invention the lower scoop's cavity accepts the upper scoop's guide resulting in an easier assembly procedure and a more efficient joint. Many ultimate consumers of an ice cream cone have personal preferences of adding various condiments, sauces and the like to their ice cream cone. The cavity provides an easy and efficient holding device for said condiments.

It is intended and desired that the embodiments shown and described in detail herein shall be deemed illustrative in nature and not restrictive in order that various modifications thereof will be apparent to those skilled in the art and be applied thereto without departing from the scope of the present invention.

Having just described the invention what I claim is:

1. An ice cream cone assembly comprising:
a cone with an apex angulated internal surface having a plurality of V-shaped grooves which communicate with a plurality of angulated teeth coincidingly located in a scoop seating area of an ice cream scoop; and
an ice cream scoop having at its lower end an angulated guide with a scoop seating area the said guide having a plurality of teeth which communicate with said grooves located in said cone.

2. An ice cream cone assembly comprising:
a cone with an apex angulated internal surface having a plurality of V-shaped grooves which communicate with a plurality of angulated teeth coincidingly located in a scoop seating area of an ice cream scoop; and
an ice cream scoop having at its lower end an angulated guide with a scoop seating area the said guide having a plurality of teeth which communicate with said grooves located in said cone and having at its upper end a cavity with a plurality of V-shaped grooves so formed with a female surface so angulated to accept a secondary ice cream scoop guide so positioned with said secondary ice cream scoop having its guide insertable in said ice cream scoop.

3. An ice cream cone assembly as described in claim 1 whereby the said cavity is filled with an edible condiment.

* * * * *